United States Patent
Beyfuss et al.

(12)

(10) Patent No.: US 6,238,097 B1
(45) Date of Patent: May 29, 2001

(54) SHEET-METAL CAGE FOR ROLLER BEARINGS

(75) Inventors: Berthold Beyfuss, Kaisten; Peter Horling, Mainberg; Jurgen Sturzenberger, Ettleben, all of (DE)

(73) Assignee: SKF GmbH (DE)

( * ) Notice: Subject to any disclaimer, the term of this patent is extended or adjusted under 35 U.S.C. 154(b) by 0 days.

(21) Appl. No.: 09/093,334

(22) Filed: Jun. 8, 1998

(30) Foreign Application Priority Data

Jun. 7, 1997 (DE) .................................................. 197 24 068

(51) Int. Cl.$^7$ ........................................................ F16C 33/46
(52) U.S. Cl. ................................................ 384/572; 384/575
(58) Field of Search .................................... 384/575, 576, 384/572, 577, 532

(56) References Cited

U.S. PATENT DOCUMENTS

| | | |
|---|---|---|
| 1,840,607 | 1/1932 | Scribner et al. . |
| 3,767,278 | 10/1973 | Knowles . |
| 4,522,516 * | 6/1985 | Neese ........................ 384/575 |
| 5,660,593 | 8/1997 | Urban et al. . |

* cited by examiner

*Primary Examiner*—Lenard A. Footland
(74) *Attorney, Agent, or Firm*—Eugene E. Renz, Jr., PC

(57) ABSTRACT

A Sheet-metal cage for rollers of roller bearings, confronting a section having pockets for rollers and at least one side ring having a bore surface extending from one end of said section said ring-shaped section 8 of the side ring 2 carrying the bore surface 3 is connected to the sheet-metal cage by radially deformable flexing elements 7.

9 Claims, 4 Drawing Sheets

SHEET-METAL CAGE FOR ROLLER BEARINGS

FIELD OF THE INVENTION

The present invention relates improvements in sheet-metal cages for roller bearings.

BACKGROUND OF THE INVENTION

Sheet-metal cages are not new per se. For example, U.S. Pat. No. 1,840,607 shows a typical sheet metal cage. Cages of this type are usually shaped out of raw material. Cages for conical roller bearings are often provided with a side ring on the smaller diameter of the cage. The bore surface of this side ring is designed as a sliding surface and is guided on a corresponding flange of the inner ring. To make it possible for the set of rollers, the cage, and the inner ring to be assembled, measures must be taken to ensure that the rollers can be inserted in the axial direction over the flange of the inner ring. One possibility consists in first expanding the side of the cage with the smaller diameter and then drawing it back in again to the operating dimension after it has been installed. This last work step, however, has disadvantageous effects on the precise circular form of the bore surface of the side ring and thus on the behavior of the cage as it slides on, and is guided by, the flange of the inner ring. It cannot be expected, furthermore, that the drawing-in step will be able to produce the narrow gap between the surface of the flange and the surface of the bore required for a sliding bearing at this point, because the cage material will spring back. The disadvantages described here on the basis of a cage for conical roller bearings also occur in the case of flange-guided cages for cylindrical roller bearings and self-aligning roller bearings when the cage is subjected to a subsequent forming step after the bearing has been assembled.

SUMMARY OF THE INVENTION

With the foregoing in mind, it is an object of the present invention to create a sheet-metal cage for roller bearings of the type described above with a guide surface in the bore of its side ring which is not deformed or changed during subsequent reshaping or calibrating operations.

The task is accomplished in that a ring-shaped section of the side ring carrying the bore surface is connected to the sheet-metal cage by way of radially deformable flexing elements. The flexing elements prevent most of the forces of radial deformation from being transferred to the part of the side ring carrying the bore surface during the step of drawing-in the sheet-metal cage. Thus, the bore surface retains its original form and diameter, designed to correspond to the surface of the flange on the inner ring. This means that uniform results with respect to guide properties between the surfaces of the flange and the bore are obtained, especially under conditions of mass production.

BRIEF DESCRIPTION OF THE DRAWINGS

These and other objects of the present invention and various features and details of the operation and construction thereof are hereinafter more fully set forth with reference to the accompanying drawings, wherein:

FIG. 4A is an exploded sectional view showing the sheet metal cage of the present invention with conical roller bearings positioned within its pockets and the inner ring of the bearing being axially positioned within the cage;

FIG. 4B is a sectional view similar to FIG. 4A showing the inner ring axially positioned within the bearing cage prior to reshaping the flange end of the bearing cage;

FIG. 4C is a sectional view similar to FIGS. 4A and 4B showing the flange end of the bearing cage reshaped during the drawing in process to the desired configuration through the deforming of the flexible elements of the cage flange thereby leaving the inner ring of the cage flange with a non-deformed guide bore;

FIG. 4D is a sectional view of a completely assembled conical roller bearing;

DETAILED DESCRIPTION OF THE PREFERRED EMBODIMENTS

Figure 1:
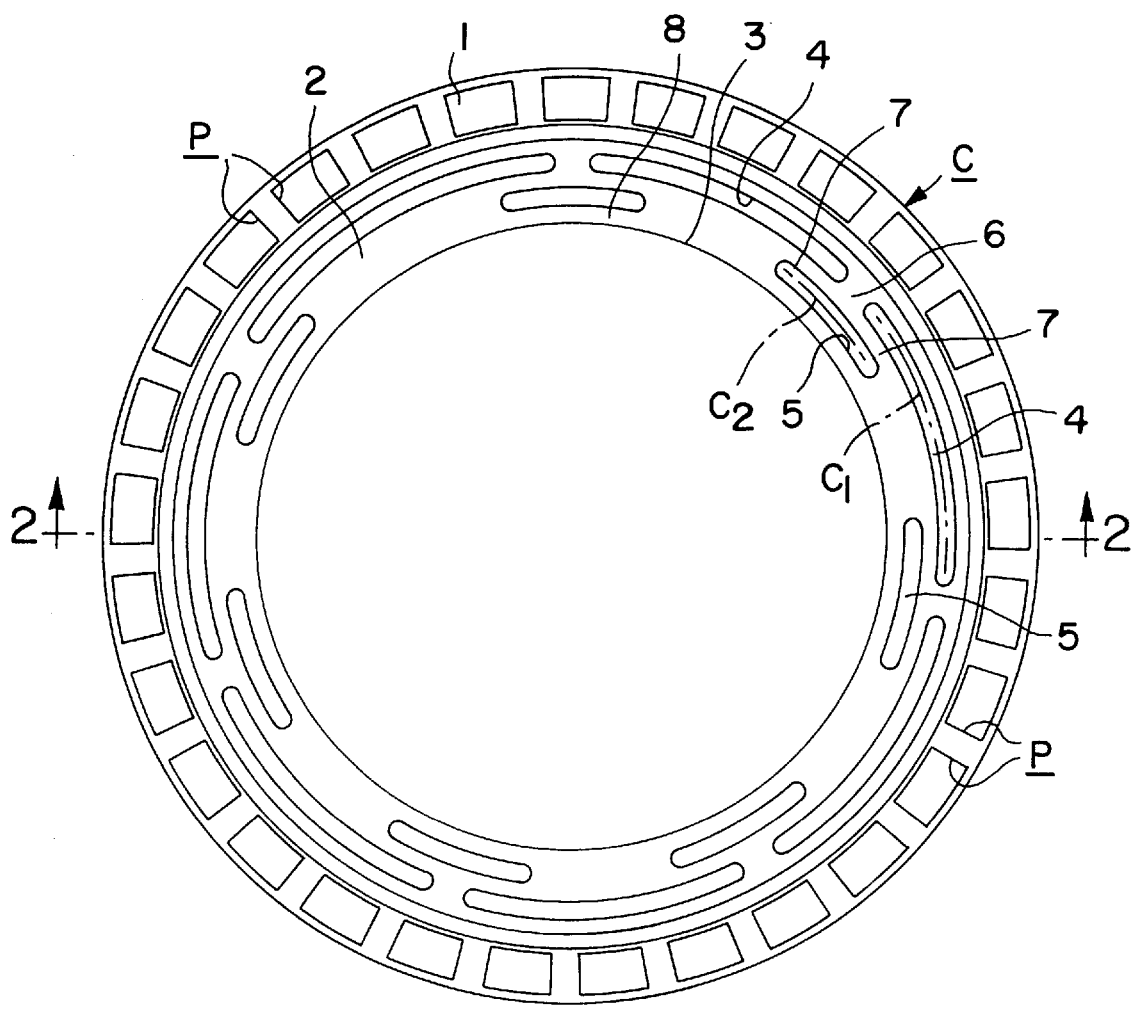
FIG. 1 shows a side elevational view of a cage for conical roller bearings with flexing elements extending around the circumference.
Figure 2:
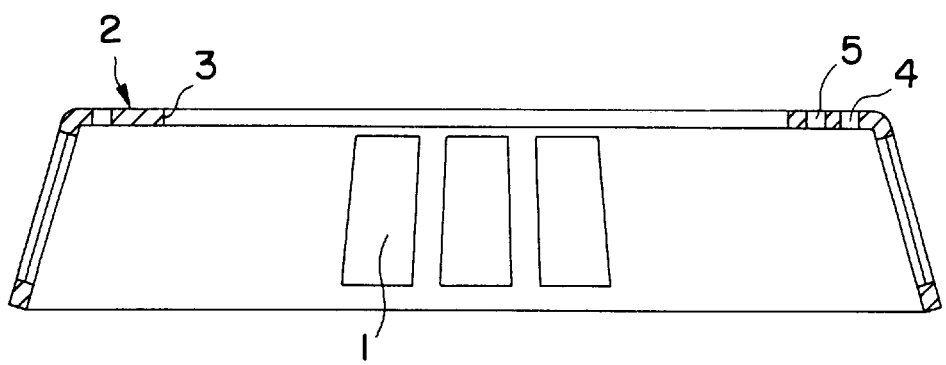
FIG. 2 is a sectional view taken on the line 2,2 of FIG. 1.
Figure 3:
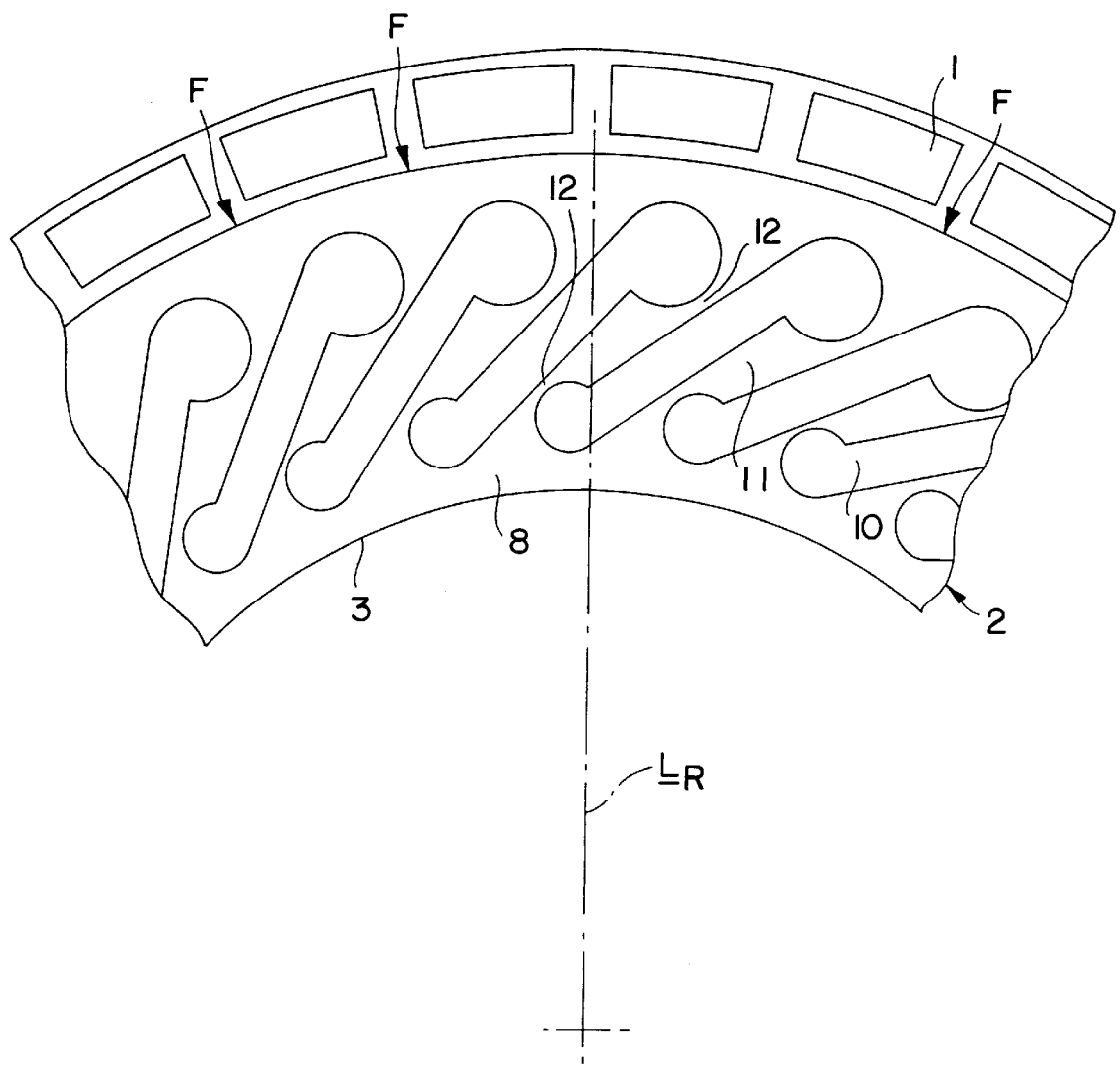
FIG. 3 is an enlarged fragmentary side elevational view showing a portion of a cage for conical roller bearings similar to FIG. 1 but having a modified circumferentially extending series of flexing elements provided with predetermined flexing points.

Referring now to the drawings and particularly FIGS. 1–3 thereof, there is shown a cage constructed in accordance with the present invention generally designated by the letter C which is made of sheet metal. The cage comprises a first conical section 1 having pockets P for conical rollers R. The first conical section 1 diverges downwardly and outwardly from its small diameter end. A flanged-over side ring 2 is situated in a radial plane the side ring has a bore surface 3, which slides on the shoulder surface of an inner ring $R_i$.

The form shown is the preliminary stage before the design is ready for operation and is still slightly too wide in the radial direction in the area of side ring 2 so that, in the case of conical rollers which are inserted from the inside, the inner ring $R_i$ can be introduced by way of its flange. Side ring 2 is provided with several openings 4, 5, extending in the circumferential direction and arranged on circles $C_1$ and $C_2$ so that they are radially offset The outer openings 4 and inner openings 5 are offset radially with respect to each other, so that, between two outer openings 4, there is an area of material 6, across from the center of a radially inner opening 5. Between the overlapping parts of inner and outer openings 4, 5, flexing elements 7 are therefore created, which extend in the circumferential direction.

After the conical rollers R have been inserted and after the inner ring $R_i$ has been introduced, the last step is to draw the small diameter of the cage in the area of side ring 2 radially inward by means of a tool.

Figure 6:
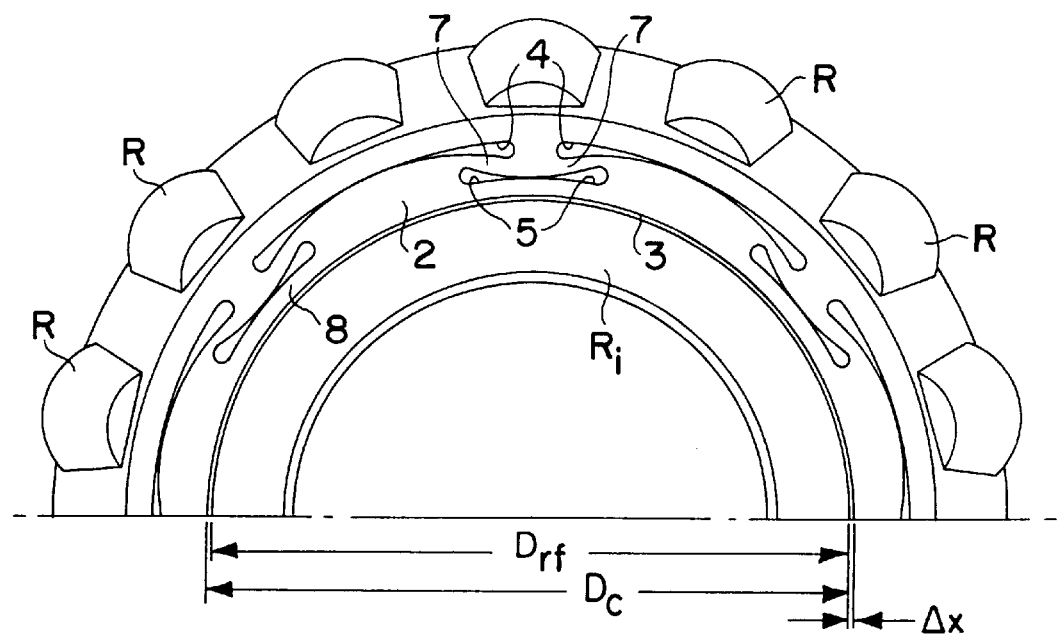
FIG. 6 is a fragmentary face view of the cage and inner ring after reforming the flange end of the cage taken on lines 6—6 of FIG. 4C.

Thus, flexing elements 7 are slightly deformed in the radial direction into openings 4, 5 (See FIG. 6). Radially inward-lying section 8 of the side ring carrying the bore surface remains unaffected by this.

In the case of the example shown in FIG. 3, openings 10, which are slanted with respect to a radius line $L_R$, are provided. Spoke-like webs 11, slanted at the same angle, remain between the openings. The radial ends of openings 10 are expanded into circles. As a result, the areas of material at the ends of spoke-like webs 11 are weakened. They thus act as predetermined flexing points 12 under the action of radial forces F during the radial drawing-in step, as a result of which the outer area of the cage compresses at this end in the circumferential direction. The reduction of the diameter causes spoke-like webs 11 to slant even farther as a result of the bending at predetermined flex points 12, the displacement being like that of the sides of a parallelogram. As a result of these weakened areas, only relatively small radial forces are transferred to inner section 8 of the side ring, these forces not being strong enough to deform the ring. Bore surface 3 thus retains its nominal dimension and does not lose its shape.

Figure 4A:
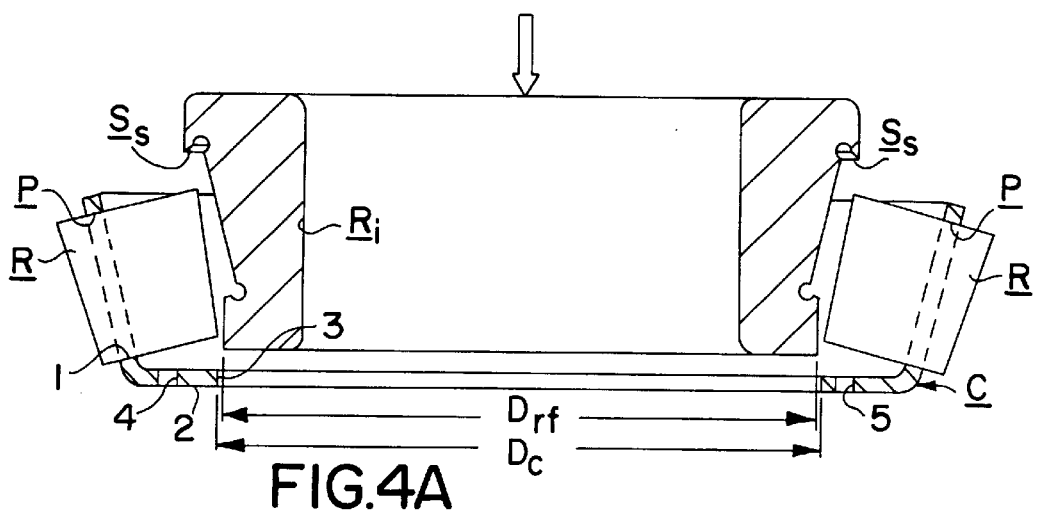
FIGS. 4A–4D, inclusive, are sequential views illustrating the assembly of a conical roller bearing having a sheet metal cage such as the type shown in FIGS. 1 and 2.
Figure 4B:
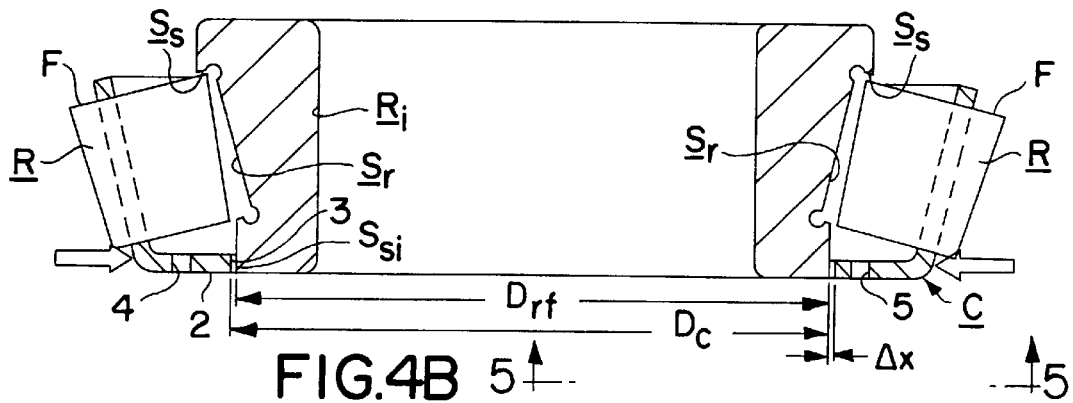
Figure 4C:
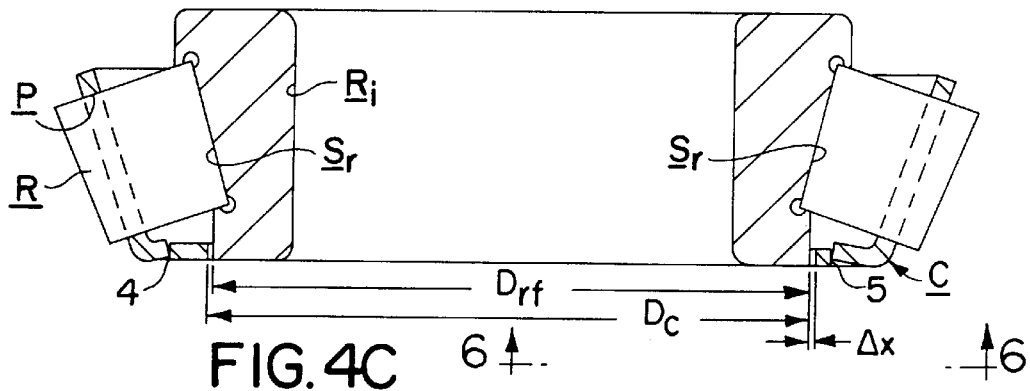
Figure 4D:
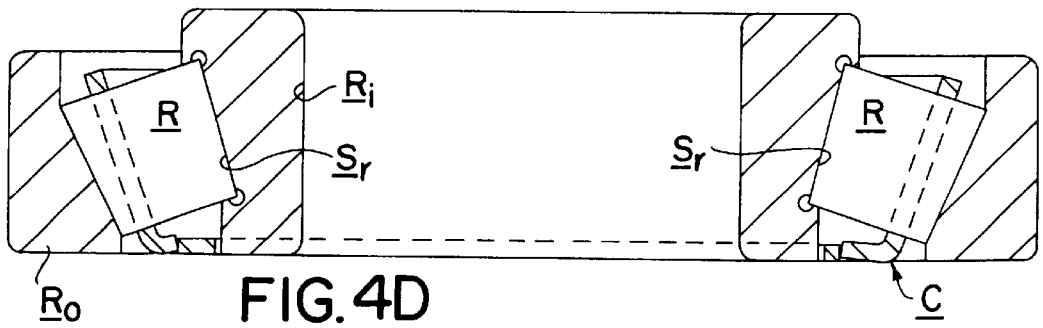
Figure 5:
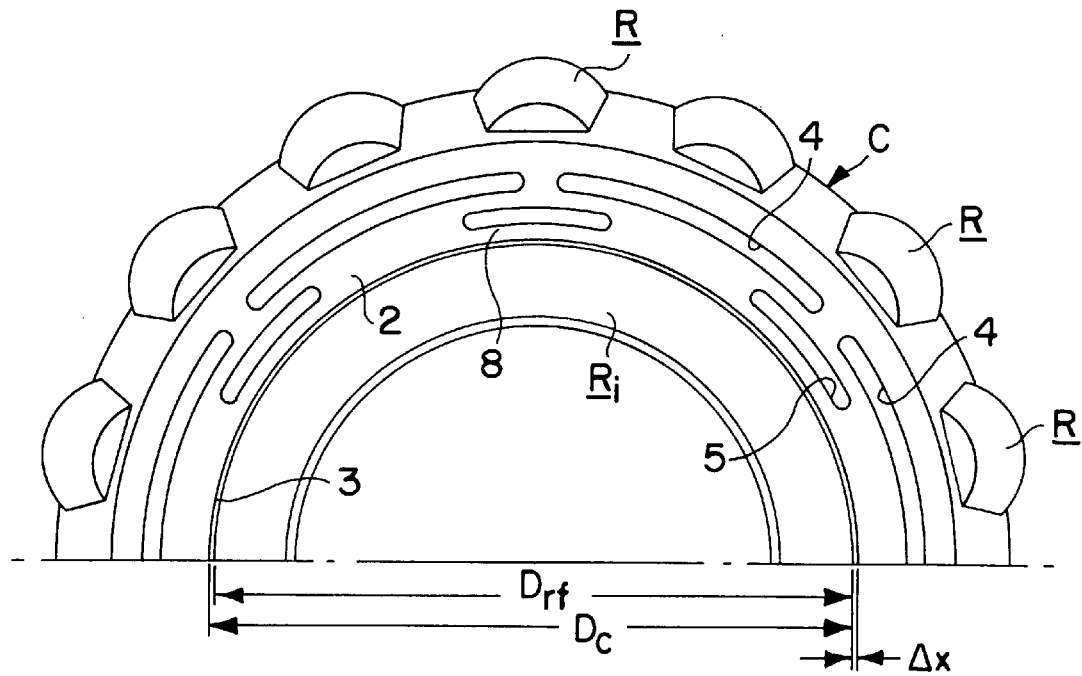
FIG. 5 is a fragmentary face view of the cage and inner ring prior to reforming the flange end of the cage taken on lines 5—5 of FIG. 4B.

As illustrated in FIGS. 4A–4C, inclusive, the diameter $D_{rf}$ of the small diameter end of the inner ring $R_1$ is slightly smaller than the smallest diametric trace of the rollers and has a flange diameter smaller than the bore diameter of the flange of the cage. In other words, the diameter $D_c$ of the bore in the cage flange is preferably greater than the diameter $D_{rf}$ of the smallest flange of the inner ring $R_i$ to provide a small clearance $\Delta_x$ between the inner ring flange outer surface and the inner terminal edge of the cage flange.

FIGS. 4A–6, inclusive, show the steps in assembling a conical roller bearing assembly utilizing a cage C in accordance with the present invention. As illustrated in FIG. 4A, the rollers R are positioned in the pockets P of the cage and the inner ring $R_i$ inserted downwardly from the large diameter end of the cage interiorly of the array of rollers R whereby as shown in FIG. 4B, the large axial end face F of the rollers R are engaged by a shoulder surface $S_s$ at the large diameter end of the inner ring $R_i$. Note that in this position, the rollers R are spaced radially outwardly from the raceway surface $S_r$ and in this position, the inner diameter 3 of the inner edge of the side ring 2 is aligned with the shoulder surface $S_{si}$ at the small diameter end of the inner ring and spaced therefrom by a distance $\Delta_x$. A force is then applied by a suitable tool in a circumferential direction to the outer edge of the side ring 2 in a manner illustrated in FIG. 4B which causes deformation of the side ring by radial displacement afforded by the inner and outer openings 4, 5 and in this process the rollers are fully seated and engage the raceway surface $S_r$ of the inner ring Ri while maintaining the desired clearance $\Delta_x$ between the side ring of the cage and the shoulder surface at the small diameter end of the inner ring $R_i$. In the embodiment illustrated in FIG. 3, the configuration of slots and spoke-like webs 11 produces the same effect which is described above.

Even though particular embodiments of the invention have been illustrated and described herein, it is not intended to limit the invention and changes and modifications may be made therein within the scope of the following claims.

What is claimed is:

1. Sheet-metal cage for rollers of roller bearings, comprising a section (1) having pockets for rollers and at least one side ring (2) having an inner section (8) having a bore surface (3), said inner section (8) being connected to the sheet-metal cage by radially deformable flexing elements (7), whereby a force applied to the side ring in a radial direction to seat the rollers during assembly of the rollers and cage to a ring of a bearing deforms said flexing elements while maintaining a predetermined clearance between the bore surface and ring of the bearing.

2. Sheet-metal cage according to claim 1, wherein the side ring (2) is provided with slot-shaped openings (4, 5) on at least two circles of different diameters, the openings (4, 5) being distributed around the circumference and extending in the circumferential direction, and wherein the openings (4) on one circle are offset in the circumferential direction with respect to the openings (5) on the other circle.

3. Sheet-metal cage according to claim 2, wherein the number of openings (4, 5, 10) on one circle is calculated to divide evenly into the number of pockets.

4. Sheet-metal cage according to claim 2, wherein the area of material (6) between two openings (4, 5) on one circle is across from the center of an opening (4, 5) on the other partial circle and continues on both sides in the circumferential direction as a pair of flexing elements (7).

5. Sheet-metal cage according to claim 1, wherein the flexing elements are designed as spoke-like webs 11 which are slanted with respect to the radius.

6. Sheet-metal cage according to claim 5, wherein the spoke-like webs 11 are formed by slot-like openings 10, which are distributed around the circumference and slanted with respect to the radius line in question.

7. Sheet-metal cage according to claim 5, wherein the spoke-like webs 11 are slanted by an angle of 30–60° with respect to the radius line in question.

8. Sheet-metal cage according to claim 5, wherein the spoke-like webs 11 are weakened in the area of their radial ends to form predetermined flexing points 12.

9. Sheet-metal cage according to claim 1, wherein at least six pairs of flexing elements (7) are distributed around the circumference.

* * * * *